United States Patent [19]

Nakazawa et al.

[11] Patent Number: 5,484,981
[45] Date of Patent: Jan. 16, 1996

[54] METHOD OF CUTTING A HOLLOW METALLIC MATERIAL

[75] Inventors: Yasushi Nakazawa; Katsuhiro Kitamura; Yasunori Oku, all of Utsunomiyashi; Masatoshi Enomoto, Oyamashi, all of Japan

[73] Assignee: Honda Giken Kogyo Kabushiki Kaisha, Osaka, Japan

[21] Appl. No.: 293,339

[22] Filed: Aug. 24, 1994

[51] Int. Cl.⁶ .................................................... B23K 26/08
[52] U.S. Cl. .............................. 219/121.72; 219/121.76
[58] Field of Search ......................... 219/121.67, 121.72, 219/121.76, 121.77, 121.78, 121.8, 121.85; 72/294

[56] References Cited

U.S. PATENT DOCUMENTS

| | | | |
|---|---|---|---|
| 3,943,324 | 3/1976 | Haggerty | 219/121.76 |
| 4,365,136 | 12/1982 | Gottlieb | 219/121.76 |
| 4,533,814 | 8/1985 | Ward | 219/121.67 |
| 4,609,807 | 9/1986 | Morrissy et al. | 219/121.67 |
| 4,694,139 | 9/1987 | Röder | 219/121.78 |

FOREIGN PATENT DOCUMENTS

| | | | |
|---|---|---|---|
| 59-191585 | 10/1984 | Japan . | |
| 59-193783 | 11/1984 | Japan . | |
| 59-212185 | 12/1984 | Japan | 219/121.72 |
| 4-200987 | 7/1992 | Japan . | |
| 4-327392 | 11/1992 | Japan | 219/121.67 |

*Primary Examiner*—Teresa J. Walberg
*Assistant Examiner*—Gregory L. Mills
*Attorney, Agent, or Firm*—Armstrong, Westerman, Hattori, McLeland & Naughton

[57] ABSTRACT

A laser-emitting head (12) is placed in a cavity (6) of an aluminum hollow and profile material (3), the material being of a desired shape in cross section and having an inner peripheral wall. A laser beam of an energy level capable of cutting the material is irradiated from the cavity onto the inner peripheral wall while the head is being rotated along the wall in a circular direction. The hollow and profile material (3) can be sliced in this manner to produce knuckles (1) as one of automobile parts, even if it is of a comparatively large size adapted for production of larger knuckles.

5 Claims, 4 Drawing Sheets

5,484,981

METHOD OF CUTTING A HOLLOW METALLIC MATERIAL

BACKGROUND OF THE INVENTION

1. Field of the Invention

The present invention relates to a method of cutting a hollow and elongate material which is made of a metal such as aluminum and is used to manufacture for example knuckles or the like automobile parts, or to manufacture cylinders or the like large-sized profile parts.

2. Prior Art

The classic sawing, the plasma-arc cutting and the like technique have been employed to slice for example an aluminum hollow extrusion, especially an extrusion of a large-diameter extrusion.

It is however noted that the a saw for the cutting of such a material is applied to a considerably large peripheral zone, and it is somewhat difficult to treat with swarf.

The plasma-arc cutting is also applied to a large peripheral zone, and lowers the mechanical strength of an adjacent portion due to a high temperature. Further, a considerable amount of mud is produced from the portion cut in this way and sticks to the inner surface of the hollow material, also making it difficult to remove the mud.

Therefore, the laser cutting of those materials has been studied and proposed because it is free from the described various drawbacks.

Generally and in nature, a laser energy for cutting the material is restricted only to a pin point where the laser beam is focused and possibly to a very narrow region adjacent to the pin point. In a case wherein a large-diameter hollow extrusion has to be sliced by the laser cutting method, the laser beam will be applied from the outside and onto a peripheral portion in a transverse direction. Another peripheral portion located opposite to the first mentioned portion in a diametrical direction cannot receive any effective amount of the laser energy, so that the extrusion is not sliced completely in a satisfactory manner. Thus, the laser cutting has been deemed to be a method improper to slice such a hollow material of a comparatively large size.

OBJECTS OF THE INVENTION

A primary object of the present invention, which was made in view of the background in this field, is therefore to provide a novel and more effective method of cutting a hollow material which is made of a metal such as aluminum and is of a large size.

Other objects and advantages will become apparent from the preferable embodiments described below. It will be understood that the scope of the invention is not delimited to those embodiments given only by way of example, but they may be modified in any manner without deviating from the spirit of the present invention.

SUMMARY OF THE INVENTION

In order to achieve the primary object, the method proposed herein to cut a hollow metallic material does comprise the steps of: preparing a source for emitting a laser beam of an energy level capable of cutting the material; then initiating to radiate the laser beam at least from the inside of the material towards an inner peripheral wall surface; and subsequently rotating the source along the inner wall surface in a circular direction so as to sever a slice from a remainder of the material.

This method enables a satisfactory and complete cutting of the material, and the problem inherent in the prior art that the material portion to be cut cannot have been arranged on or close to a focus of the laser beam radiated from the outside is now eliminated to ensure the satisfactory slicing of said material.

The laser beam energy can be imparted also to inner longitudinal partitions or internal walls which the hollow material may have.

As summarized above, the hollow metallic material is subjected to the laser beam irradiated at least onto its inner periphery and rotated therealong, so that even the laser cutting of said material of a considerably large size is now possible.

If required or desired, the laser beam may be irradiated also from the outside onto an outer periphery of the hollow metallic material, in addition to the internal irradiation.

The laser used herein may preferably be a Nd-YAG laser or $CO_2$ laser.

An appropriate example of the hollow metallic material is a hollow aluminum profile just extruded from a die and still being at a high temperature.

BRIEF DESCRIPTION OF THE DRAWINGS

In the drawings showing embodiments of the invention.

THE PREFERRED EMBODIMENTS

Figure 1:
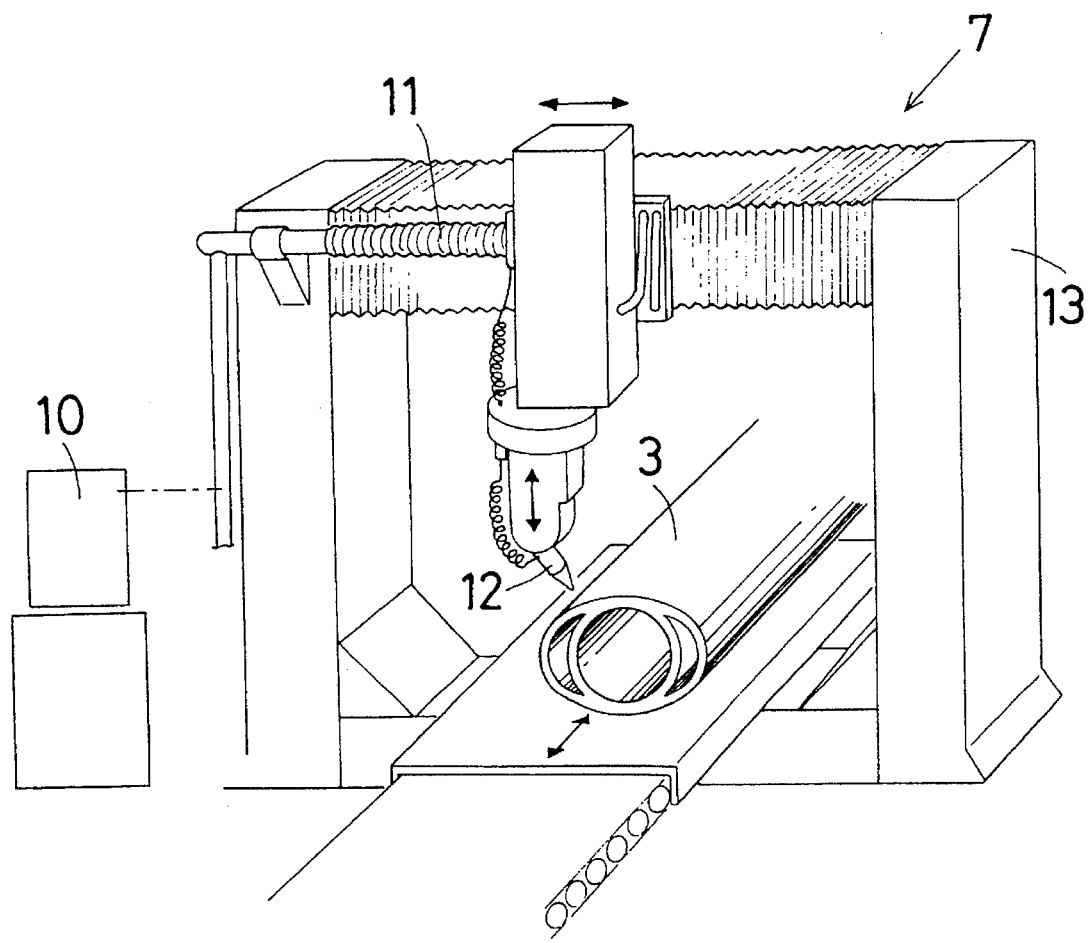
FIG. 1 is a schematic perspective view of an apparatus used to carry out the method proposed herein.

Some embodiments of the present invention will now be described referring to the drawings.

Figure 2A:
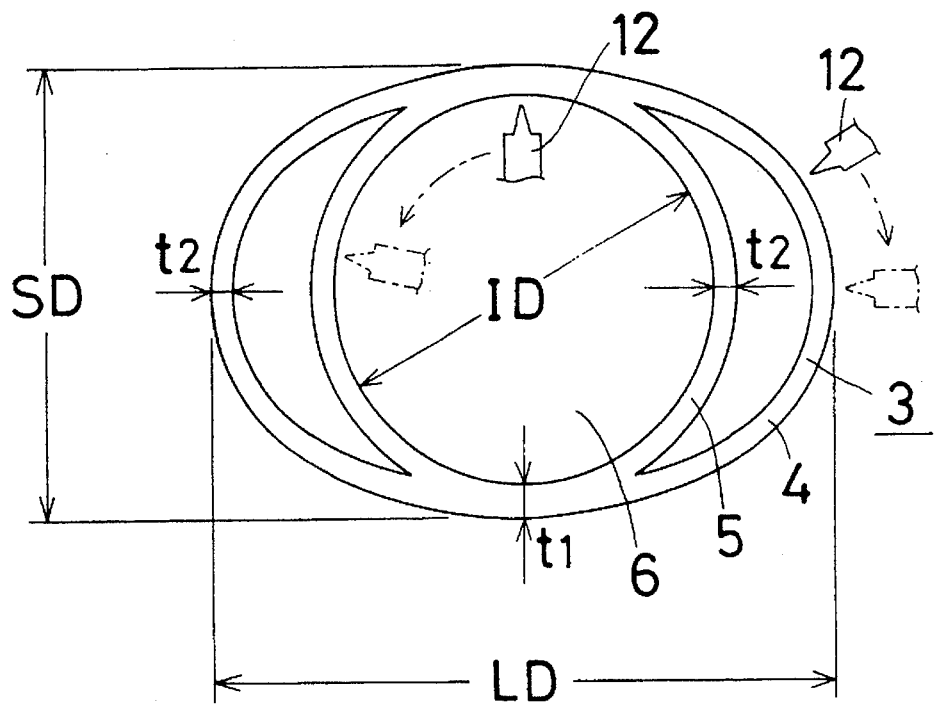
FIG. 2A is a side elevation of a hollow and profile material from which knuckles are sliced and to which the laser cutting method is being applied in an illustrated manner.
Figure 2B:
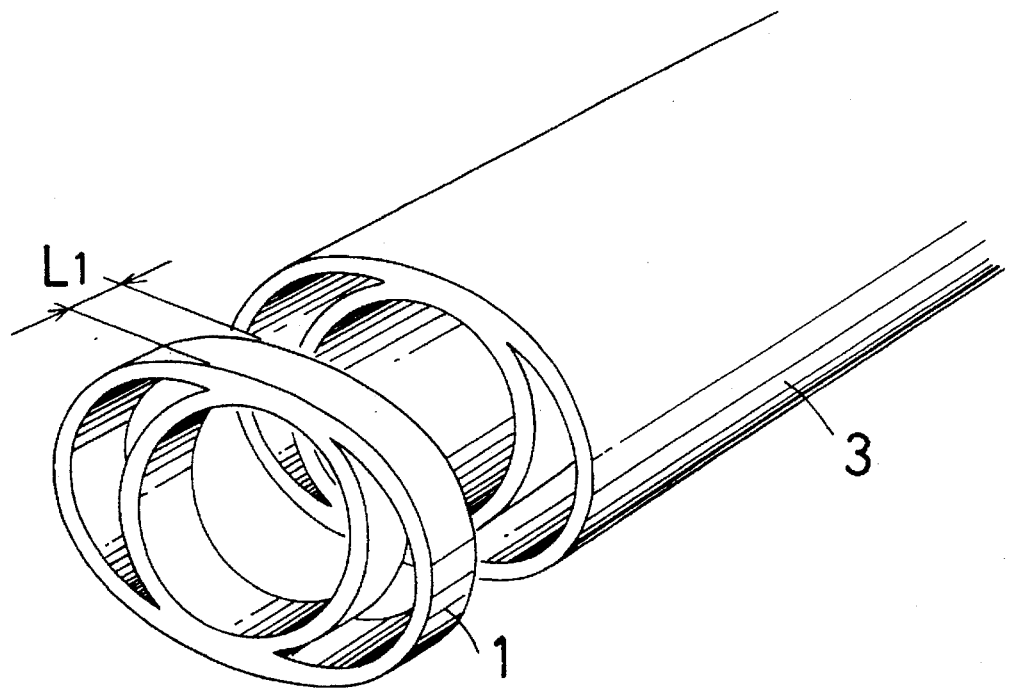
FIG. 2B is a perspective view of a knuckle sliced from a remainder of the profile material shown in FIG. 2A.
Figure 3A:
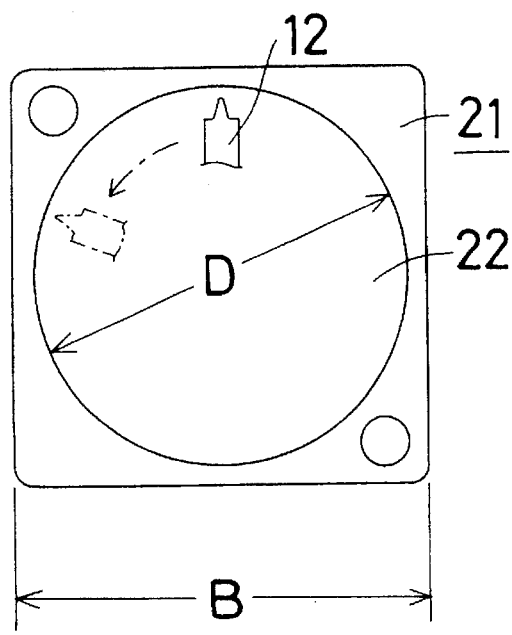
FIG. 3A is a side elevation of another hollow and profile material from which thin cylinders are sliced and to which the laser cutting method is being applied in an illustrated manner.
Figure 3B:
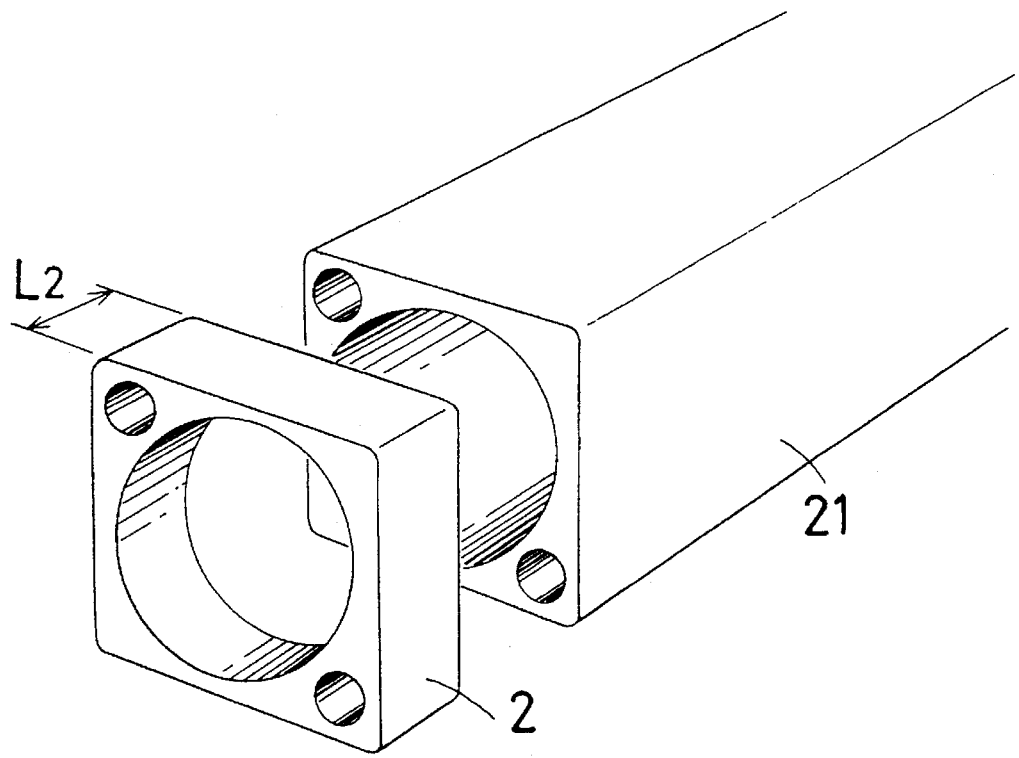
FIG. 3B is a perspective view of a thin cylinder sliced from a remainder of the profile material shown in FIG. 3A.

In a first embodiment, a knuckle 1 used as one of automobile parts as well as a cylindrical member 2 used as one of pneumatic cylinder parts are produced according to the present method, as respectively shown in FIGS. 2B and 3B.

In a case of manufacturing the knuckle 1 shown in FIG. 2B, a hollow aluminum profile material 3 having an outer peripheral wall 4 elliptic in cross section will be extruded at first. This profile material has also an inner peripheral wall 5 circular in cross section and integral with the outer wall. The inner peripheral wall 5 is of a diameter almost equal to the minor axis 'SD' (224 mm) of the outer peripheral wall 4. The major axis 'LD' of the later wall 4 is 320 mm, an inner diameter 'ID' of the former wall is 200 mm, a wall thickness $t_1$ of the portion where the outer and inner walls converge is 12 mm, and the thickness $t_2$ of the other wall portions is 10 mm.

The hollow extrusion 3 will then be sliced by a three-dimensional laser cutter 7 shown in FIG. 1. The laser preferably employable in this cutter is for example a Nd-YAG laser, whose assist gas is $O_2$ and maximum output is 100 J/P. In FIG. 1, the reference numerals 10, 11 and 12 denote a laser radiator, a waveguide for the laser beam and a laser-emitting head, respectively. The further numeral 13 denotes a three-dimensional drive mechanism for moving the head 12 along a three-dimensional locus, with the extrusion 3 being set at a desired position and then kept still.

Slices having a length '$L_1$' of 30 mm will be severed from the extrusion 3 arranged in the cutter 7, by driving the laser-emitting head 12 as follows. This head 12 will be introduced at first into the cavity 6 of the inner peripheral wall 5, through a free end of the extrusion 3. The head 12 will then be set at a distance from the inner surface of said inner wall 5, with the distance being optimum for the effective irradiation of laser beam. Subsequently, the head 12 will start and continue to radiate the laser beam, while being driven to rotate along the inner periphery and being kept at the optimum distance therefrom. At least the inner peripheral wall 5 of the extrusion 3 was cut completely by the irradiation within the cavity 6, with a pulse-width of 1 msec, at a cutting speed of 0.7 mm/sec and with a peak output of 50 kW.

There may be some cases wherein the irradiation of laser beam from the inner cavity 6 is insufficient to completely cut the peripheral walls inclusive of the outer one 4. The laser beam may be irradiated, additionally and simultaneously with the irradiation from the inside, from the outside onto the outer peripheral surface of the outer wall 4 of the profile material 3. The additional laser-emitting head will likewise be driven to rotate along the outer periphery in circular direction, so that no peripheral portion remains uncut. A loss of the material caused by such a multiple irradiation was observed to be no more than 1 mm in longitudinal direction.

The irradiation from the inside is quite novel and characteristic to the method proposed herein, whereby even the comparatively large-sized hollow material 3 can be cut by means of the laser beam. The knuckles 1 can now be produced at an improved efficiency and with a higher yield of products Of good quality.

FIGS. 3A and 3B illustrate the slicing of cylindrical parts 2. The laser-emitting head 12 will likewise be placed in the cavity 22 of an aluminum hollow extrusion 21 prepared as a raw material of the cylindrical parts. This head is also driven to rotate along the inner peripheral wall in a circular direction.

The extrusion 21 is square in cross section, and each of its sides is of a length 'B' of 216 mm. A round cavity 22 formed centrally of the cylindrical extrusion, thus each cylindrical part 2, has a diameter 'D' of 200 mm. The laser beam irradiation by means of a Nd-YAG laser, whose assist gas was $O_2$ and maximum output was 100 J/P, was carried out with a pulse-width of 1 msec, at a cutting speed of 1 mm/sec and with a peak output of 40 kW. Similarly to the first example described above, no peripheral portion remained uncut, and a loss of the material caused by the laser beam cutting was observed to be no more than 1 mm in longitudinal direction.

Figure 4:
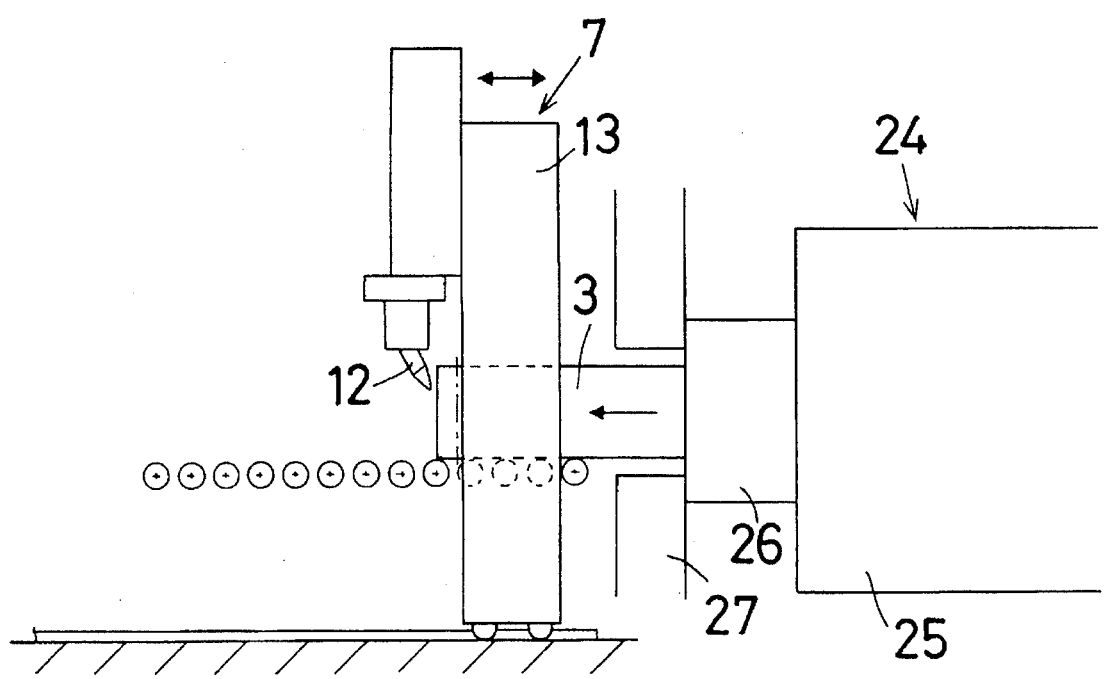
FIG. 4 is a side elevation of an arrangement which is used in another embodiment of the present method.

FIG. 4 shows another embodiment wherein the gate-shaped three-dimensional laser cutter 7 is arranged movably towards and away from an extruding die of an extruder 24. A leading end of an aluminum hollow extrusion 3 just extruded and still being hot is guided into the cutter 7 so as to be subjected to the centrifugal irradiation of laser beam. The slicing is also carried out with a laser-emitting head which rotates within a cavity of the extrusion 3. The cutter 7 in this case is driven to move a distance synchronously with the running extrusion 3 and is subsequently retracted quickly the distance. Such an irradiation of laser beam onto the article 3 still hot and being extruded does increase its laser absorption, whereby a higher efficiency of the cutting process is realized to minimize energy loss. It is a matter of course that the laser cutting may be done independently of the extruding process, after the article 3 has been extruded but is still hot. The extruder 24 comprises a container 25, a die block 26 and an end platen 27.

A $CO_2$ laser or the like may substitute for the Nd-YAG laser used in the embodiments.

What is claimed is:

1. A method of cutting a hollow elongated metallic material, the method comprising the steps of:

providing a hollow elongated metallic material having an inner peripheral wall and having an outer peripheral wall spaced from said inner peripheral wall in a radial direction therefrom and over a portion of said inner peripheral wall, such that the hollow elongated metallic material has at least partially a double-wall cross-section;

preparing a source for emitting from a laser head a laser beam of an energy level capable of cutting the material;

then initiating to irradiate the laser beam at least from the inside of the material onto an inner peripheral wall surface of the material; and subsequently rotating the laser head along the inner wall surface in a circular direction so as to sever a slice from a remainder of the material; and irradiating a second laser beam onto the outer peripheral wall surface, from the outside of the material.

2. The method as defined in claim 1, wherein the laser beam is emitted from a Nd-YAG laser.

3. The method as defined in claim 1, wherein the laser beam is emitted from a $CO_2$ laser.

4. The method as defined in claim 1, wherein the hollow metallic material is an aluminum hollow extrusion which has just been extruded at a high extrusion temperature but is still at a temperature between the high extrusion temperature and an ambient temperature, without having yet cooled to the ambient temperature, wherein the temperature between the high extrusion temperature and the ambient temperature is sufficient to increase energy absorption of the laser beam and, thus, to increase efficiency and minimize energy loss.

5. The method as defined in claim 1, wherein said step of providing the hollow elongated metallic material includes extruding to form the hollow elongated metallic material.

\* \* \* \* \*